Patented Feb. 10, 1931

1,791,704

UNITED STATES PATENT OFFICE

SAM C. BENNETT, OF BIRMINGHAM, ALABAMA

CEMENT WATERPROOFING SOLUTION

No Drawing.  Application filed August 2, 1929. Serial No. 383,161.

The invention relates to the broad class of coating compositions and has special reference to a composition or solution to be applied to finished cement walls, floors or the like for the purpose of water proofing the same.

The principal object of the invention is to provide a solution or composition of matter adapted to be painted, sprayed, swabbed or otherwise applied to finished cement walls, floors and the like for the purpose of making them water proof and thereby increasing the durability.

Another object of the invention is to provide a composition adapted to be mixed with water and pure cement and applied to walls and floors for not only water proofing the same but also for improving the appearance, the pure cement acting to rejuvenate the walls or floors and hiding stains and discolorations which may be present as the result of a weather condition or other causes.

A further object is to provide a composition of this character and for this purpose which will be simple and inexpensive to make, easy to apply, efficient in action, durable in service, and a general improvement in the art.

To the attainment of the foregoing objects and advantages the invention preferably consists in the employment of the ingredients and proportions thereof to be hereinafter more particularly described and claimed.

In the actual carrying out of the invention, I preferably make use of sal soda or sodium carbonate, nine parts, alum, or aluminum sulphate, one part, and permanganate of potash, one-thirty-second part. These various ingredients are thoroughly mixed together or compounded and subsequently I add thereto approximately twenty parts of water. Clearly if these various ingredients are originally dissolved in water then the different solutions would be mixed together in corresponding proportions. In any event, after the ingredients have been mixed and after water has been added thereto in the proportions specified, the solution is mixed with pure cement and then is applied to the finished walls, floors or the like by means of a brush, spray gun, swab or any other suitable device or means.

After this material has been applied and has become dry it will be found that the cement work will be thoroughly water proof. Furthermore the presence of the pure cement in conjunction with the solution or solutions will operate to apply a natural cement color to the surfaces treated so that the appearance thereof will be greatly improved especially if the cement work is discolored or weather stained. From the foregoing it is thought that the composition, its mode of application and its advantages will be readily apparent to one skilled in the art without further explanation.

While I have described a certain proportion of the ingredients and a certain treatment in the mixing thereof it should be understood that I reserve the right to make all such changes in such details as will not depart from the spirit of the invention or the scope of the subjoined claim.

Having thus described the invention, I claim:—

A composition of matter for water proofing cement work comprising sodium carbonate nine parts, aluminum sulphate one part, potassium permanganate one-thirty-second part, water substantially twenty parts, together with pure cement in sufficient quantity to leave the composition fluid whereby it may be applied as a liquid coating composition to water-proof and rejuvenate worn and discolored cement.

In testimony whereof I affix my signature.

SAM C. BENNETT.